United States Patent
Kobayashi

(10) Patent No.: US 10,124,657 B2
(45) Date of Patent: Nov. 13, 2018

(54) DEFLECTOR APPARATUS

(71) Applicant: AISIN SEIKI KABUSHISIKI KAISHA, Kariya-shi, Aichi-ken (JP)

(72) Inventor: Yuki Kobayashi, Toyota (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 15/704,397

(22) Filed: Sep. 14, 2017

(65) Prior Publication Data

US 2018/0170159 A1    Jun. 21, 2018

(30) Foreign Application Priority Data

Dec. 21, 2016 (JP) ................................. 2016-248051

(51) Int. Cl.
| | |
|---|---|
| *B60J 7/22* | (2006.01) |
| *B60J 7/057* | (2006.01) |
| *B60J 7/00* | (2006.01) |
| *B60J 7/04* | (2006.01) |

(52) U.S. Cl.
CPC ............... *B60J 7/22* (2013.01); *B60J 7/0084* (2013.01); *B60J 7/04* (2013.01); *B60J 7/057* (2013.01)

(58) Field of Classification Search
CPC ............ B60J 7/22; B60J 7/0084; B62D 25/06
USPC ......................................... 296/217, 213, 210
See application file for complete search history.

(56) References Cited

U.S. PATENT DOCUMENTS

| | | | |
|---|---|---|---|
| 8,403,407 B2 * | 3/2013 | Fukami | B60J 7/22 296/217 |
| 8,474,906 B2 | 7/2013 | Sawada | |
| 8,662,577 B2 * | 3/2014 | Wimmer | B60J 7/22 296/217 |
| 9,248,728 B2 * | 2/2016 | Hiramatsu | B60J 7/22 |
| 2014/0284969 A1 | 9/2014 | Hiramatsu | |

FOREIGN PATENT DOCUMENTS

| | | |
|---|---|---|
| JP | 2002-356113 | 12/2001 |
| JP | 2011-143787 | 7/2011 |
| JP | 2012-153335 | 8/2012 |
| JP | 2013-520359 | 6/2013 |
| JP | 2014-180999 | 9/2014 |

* cited by examiner

*Primary Examiner* — Dennis H Pedder
(74) *Attorney, Agent, or Firm* — Finnegan, Henderson, Farabow, Garrett & Dunner, LLP

(57) ABSTRACT

A deflector apparatus includes a first locking portion for attaching a mesh type deflector, which reduces noise due to wind at an opening portion, to a drain member for suppressing infiltration of a fluid from the opening portion opened by a movable panel into a room; and a second locking portion formed in the deflector, in which the deflector is attached to the drain member by locking the second locking portion to the first locking portion.

6 Claims, 7 Drawing Sheets

DEFLECTOR APPARATUS

CROSS REFERENCE TO RELATED APPLICATIONS

This application is based on and claims priority under 35 U.S.C. § 119 to Japanese Patent Application 2016-248051, filed on Dec. 21, 2016, the entire contents of which are incorporated herein by reference.

TECHNICAL FIELD

This disclosure relates to a deflector apparatus for reducing noise due to wind flow.

BACKGROUND DISCUSSION

In the related art, a deflector apparatus for reducing noise due to wind flow at an opening portion through which wind flows is known (see JP 2002-356113A (Reference 1), JP 2011-143787A (Reference 2), and JP 2012-153335A (Reference 3)). In this type of the deflector apparatus, when a movable panel is in an open state, a front panel is movable and erected, and windshield is performed by the front panel.

However, in a case of a structure in which the front panel is erected so as to perform windshield, a structure for switching the front panel, which is a large member in size, from an accommodation state to an erected state is required, thereby resulting in a complicated structure.

Thus, a need exists for a deflector apparatus which is not susceptible to the drawback mentioned above.

SUMMARY

A deflector apparatus according to an aspect of this disclosure includes: a first locking portion for attaching a mesh type deflector, which reduces noise due to wind at an opening portion, to a drain member for suppressing infiltration of a fluid from the opening portion opened by a movable panel into a room; and a second locking portion formed in the deflector, in which the deflector is attached to the drain member by locking the second locking portion to the first locking portion.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
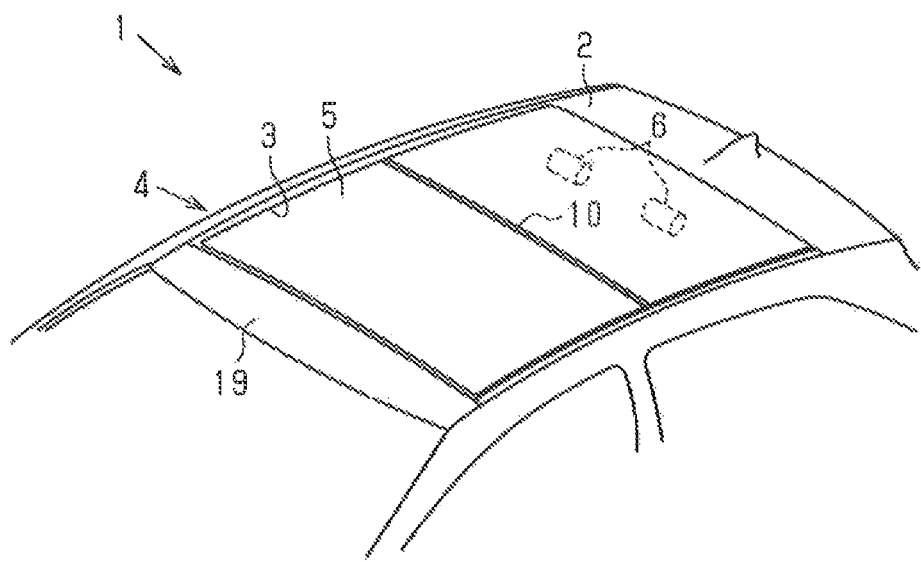
FIG. 1 is a perspective view illustrating a closed state of a deflector apparatus mounted on a vehicle of an embodiment.
Figure 2:
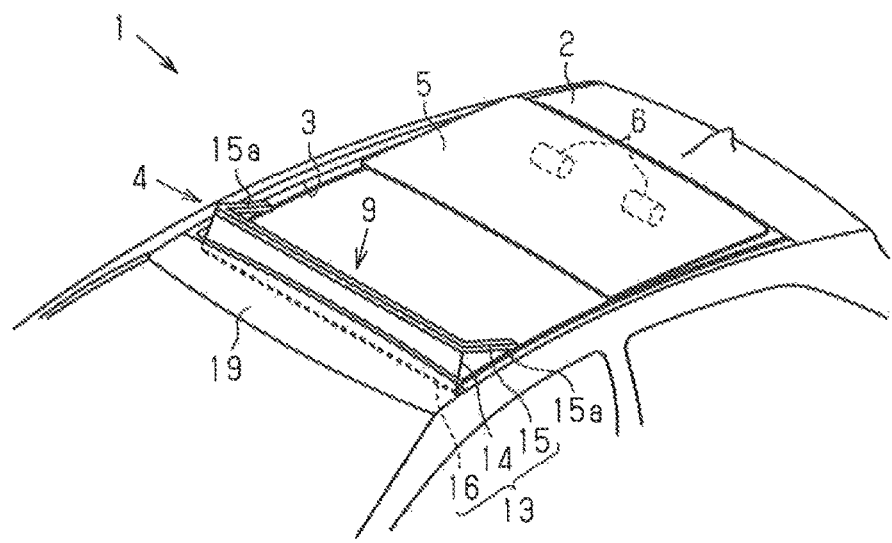
FIG. 2 is a perspective view of the deflector apparatus of an open state.

Hereinafter, an embodiment of a deflector apparatus will be described with reference to FIGS. 1 to 10. As illustrated in FIGS. 1 and 2, a sunroof device 4 for opening and closing an opening portion 3 provided on a vehicle body upper wall 2 is provided on the vehicle body upper wall 2 of a vehicle 1. The sunroof device 4 of the example is a sliding sunroof for opening and closing the opening portion 3 by sliding, for example, a movable panel 5 in a horizontal direction. The movable panel 5 is opened and closed by a driving source 6 (for example, a motor or the like) disposed in rear of the opening portion 3.

As illustrated in FIG. 2, the vehicle 1 includes a deflector apparatus 9 that suppresses noise due to wind flowing into a room from the opening portion 3 when the sunroof device 4 is in an open state. The deflector apparatus 9 is provided to suppress wind throb noise that is generated when wind periodically hits a rear end 10 of the opening portion 3, wind noise generated when wind passes through the opening portion 3, or the like when the opening portion 3 is in the open state.

Figure 3:
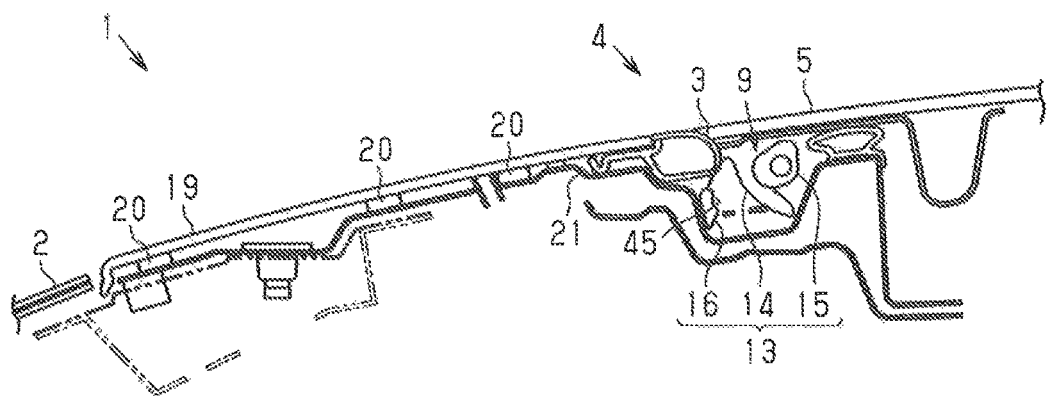
FIG. 3 is a sectional view of the deflector apparatus of a closed state.
Figure 4:
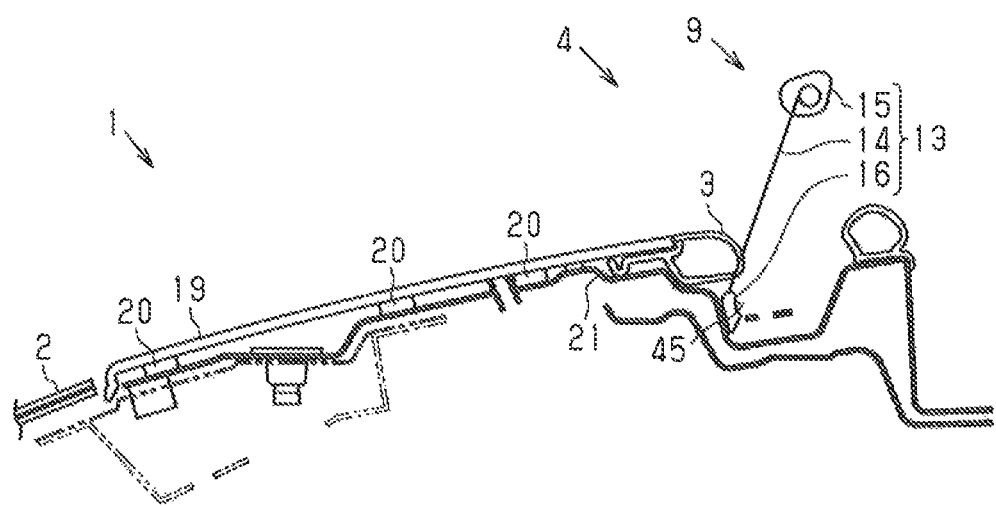
FIG. 4 is a sectional view of the deflector apparatus of the open state.

As illustrated in FIGS. 2 to 4, the deflector apparatus 9 includes a mesh type deflector 13. The deflector 13 includes a mesh member 14 that is a windshield portion, a movable-side upper deflector 15 that supports the mesh member 14, and a fixed-side lower deflector 16 that supports the mesh member 14. The upper deflector 15 is formed in a substantially U shape and base ends 15a on both sides positioned on a side opposite to the mesh member 14 are rotatably connected to the vehicle 1.

When the movable panel 5 is in a closed state, the deflector 13 is in an accommodation state in which the upper deflector 15 is accommodated inside the movable panel 5 and thereby the mesh member 14 is folded (see FIG. 3). When the movable panel 5 is in the open state, the deflector 13 is in the open state in which the upper deflector 15 is rotated around an axis of the base end 15a to be erected by a biasing member (not illustrated) and the mesh member 14 is projected upward the vehicle body upper wall 2 (see FIG. 4).

As illustrated in FIGS. 3 and 4, a front panel 19 disposed in front of the movable panel 5 is attached and fixed to a front portion of the vehicle body upper wall 2. The front panel 19 of the example is a fixed type and is, for example, formed of resin (for example, PC-PET). The front panel 19 is fixed to a base panel 21 provided in the device (inside the sunroof device 4) via an adhesive 20. A plurality of the adhesives 20 are provided and urethane adhesive is used. The base panel 21 is made of, for example, metal and is formed in a substantially plate shape of which a portion facing the opening portion 3 is opened.

Figure 5:
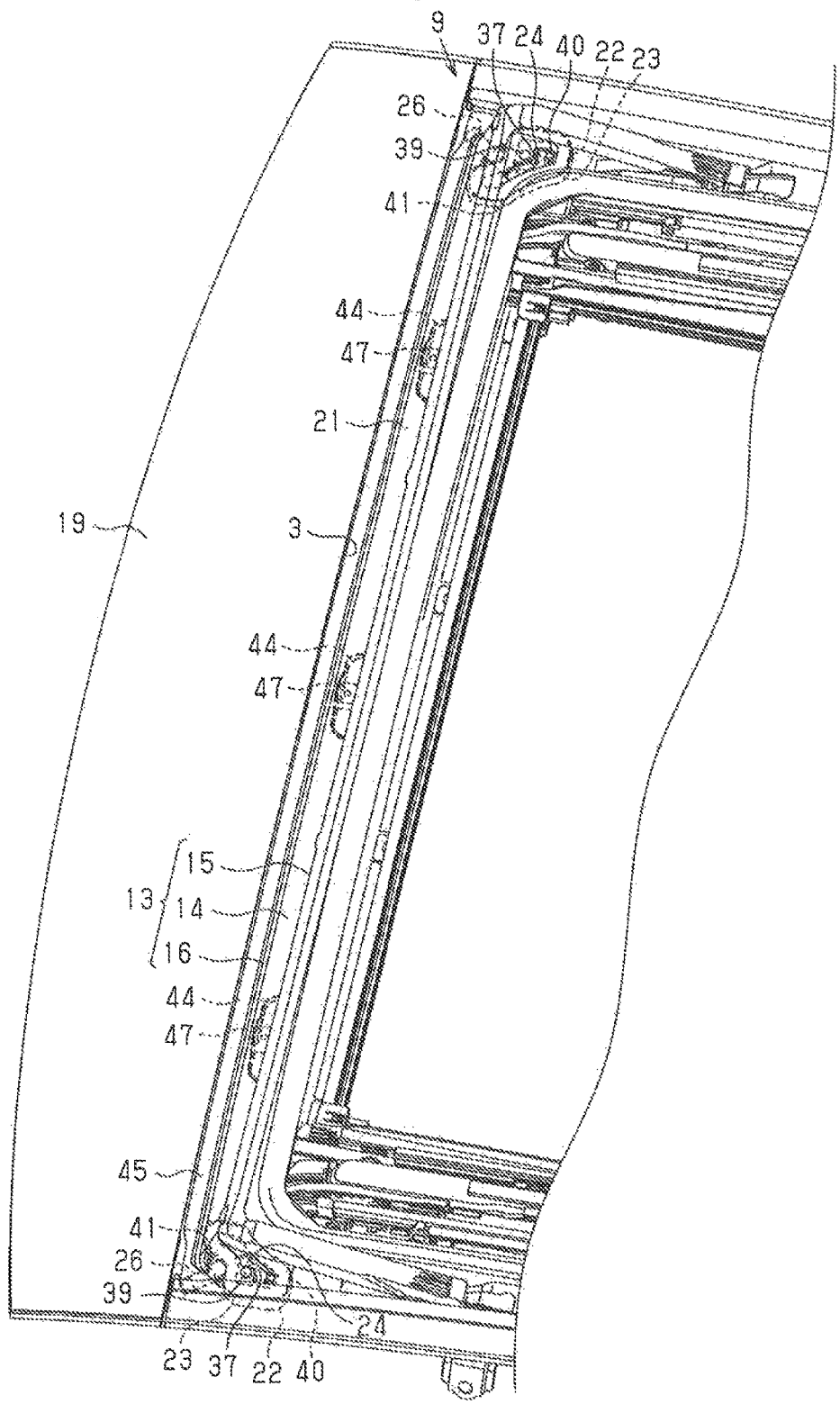
FIG. 5 is a partial enlarged perspective view of the deflector apparatus of the open state.

As illustrated in FIG. 5, the vehicle 1 is provided with a drain member 22 for suppressing infiltration of a fluid (water or the like) into the room from the opening portion 3. The drain member 22 is provided to discharge the fluid such as water infiltrated from the opening portion 3 to the outside of the vehicle. A pair of right and left (two) drain members 22 are disposed at both ends in a vehicle width direction.

Figure 6:
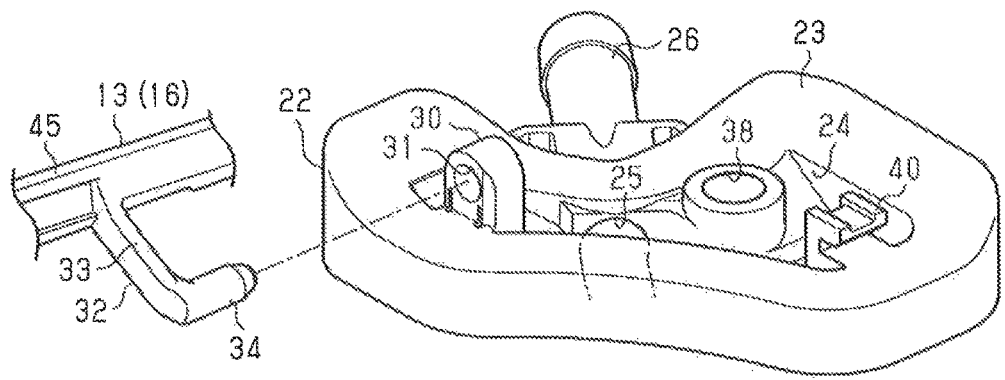
FIG. 6 is a perspective view of a drain member.

As illustrated in FIG. 6, the drain member 22 is formed with a body portion 23, a recessed portion 24 in which an upper portion of the body portion 23 is formed to be opened, and a discharging portion 26 through which the fluid such as water entering the recessed portion 24 is discharged from a hole 25 to the outside. The recessed portion 24 is formed by opening a substantially entire upper surface of the drain member 22. The discharging portion 26 is formed in a cylindrical shape protruding outward from a corner portion of the drain member 22.

Figure 7:
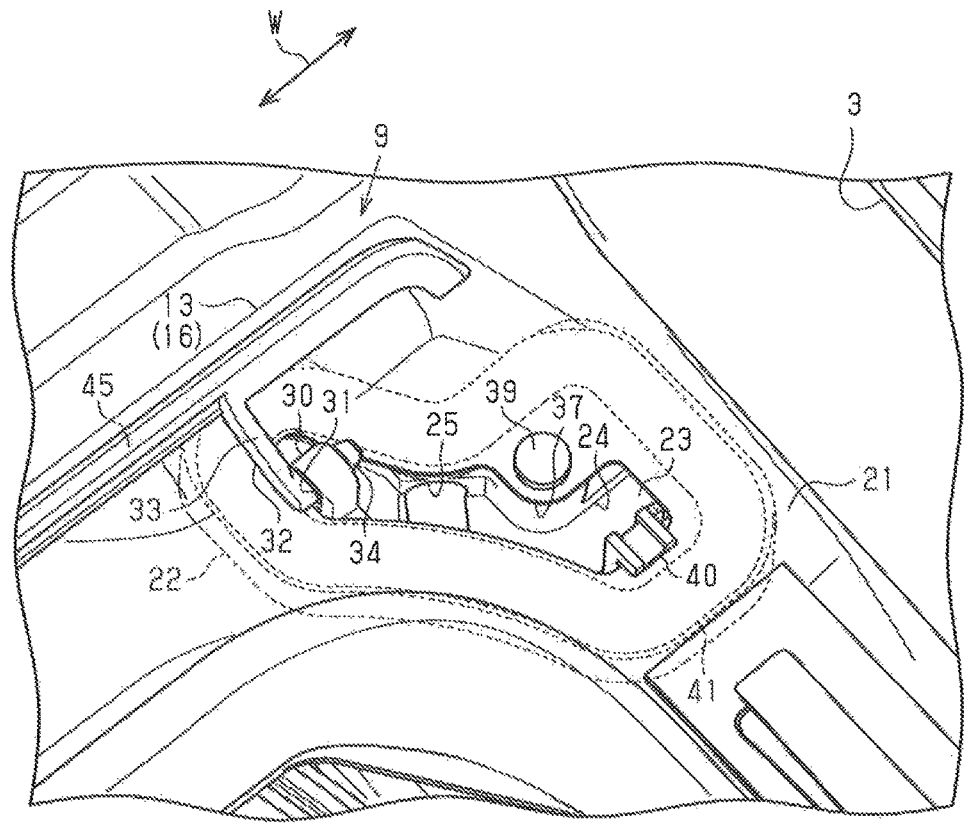
FIG. 7 is a perspective view illustrating an attaching structure of the deflector.

As illustrated in FIGS. 6 and 7, the drain member 22 is provided with a first locking portion 30 for attaching the mesh type deflector 13 (lower deflector 16 in the example). The first locking portion 30 is formed in a shape protruding upward and a locking hole 31 penetrates the first locking portion 30 in a horizontal direction.

The deflector 13 (lower deflector 16 in the example) is provided with a second locking portion 32 which can be locked by the first locking portion 30. A pair (two) of the second locking portions 32 is provided at both ends of the lower deflector 16 in a longitudinal direction. As described above, a plurality of sets (two sets in the example) of the first locking portion 30 and the second locking portion 32 are provided and, in the example, are respectively disposed at both ends of the deflector 13 in a width direction (arrow W direction of FIG. 7). In addition, the set of the first locking portion 30 and the second locking portion 32 is disposed symmetrically on right and left side in the width direction of the deflector 13.

The second locking portion 32 is formed in a shape having an arm portion 33 extending in a direction intercepting the width direction of the deflector 13 and a projection 34 extending in a direction intercepting the arm portion 33 at a tip of the arm portion 33. The deflector 13 (lower deflector 16 in the example) is attached and fixed to the drain member 22 by locking the projection 34 of the second locking portion 32 into the locking hole 31 of the first locking portion 30 between the sets respectively.

As illustrated in FIG. 7, the drain member 22 is disposed such that the body portion 23 is disposed below a lower surface of the base panel 21 in the device (inside the sunroof device 4) and the second locking portion 32 protrudes upward relative to an upper surface of the base panel 21. Specifically, an opening hole 37 is cut out in the base panel 21 and the second locking portion 32 protrudes upward from the opening hole 37 while positioning the recessed portion 24 in the opening hole 37. Therefore, the drain member 22 is attached to a back surface of the base panel 21.

The drain member 22 is attached and fixed to the base panel 21 by a locking pin 39 capable of attaching to a locking hole 38 formed in the body portion 23 a locking piece 40 protruding upward is locked to an edge portion of the opening hole 37 of the base panel 21. In addition, a seal member 41 formed in an annular shape along the opening hole 37 is provided between the base panel 21 and the drain member 22 to suppress reaching of the fluid the opening hole 37.

Figure 8:
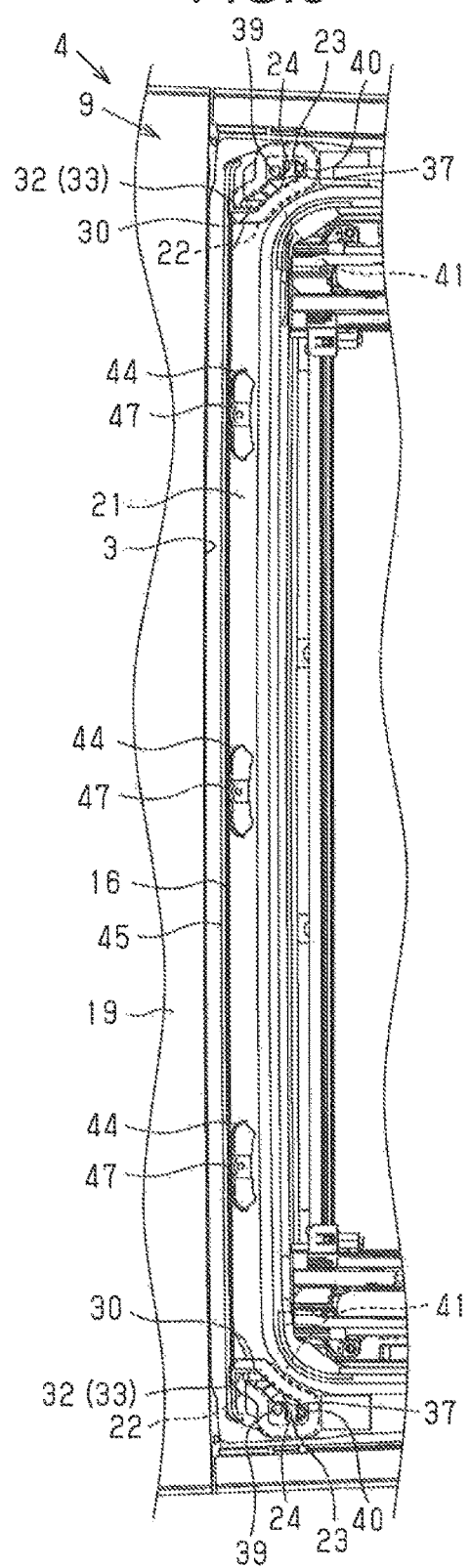
FIG. 8 is a disposition view of a positioning portion of the deflector.

As illustrated in FIG. 8, a position between both ends of the lower deflector 16 is fixed by a positioning portion 44 formed separately from the drain member 22. A plurality of the positioning portions 44 of the example are attached and fixed to the base panel 21 and are provided along the longitudinal direction of the lower deflector 16. As described above, in the lower deflector 16 of the example, a body portion 45 extending in the longitudinal direction is positioned by the plurality of the positioning portions 44 disposed at predetermined intervals.

Figure 9:
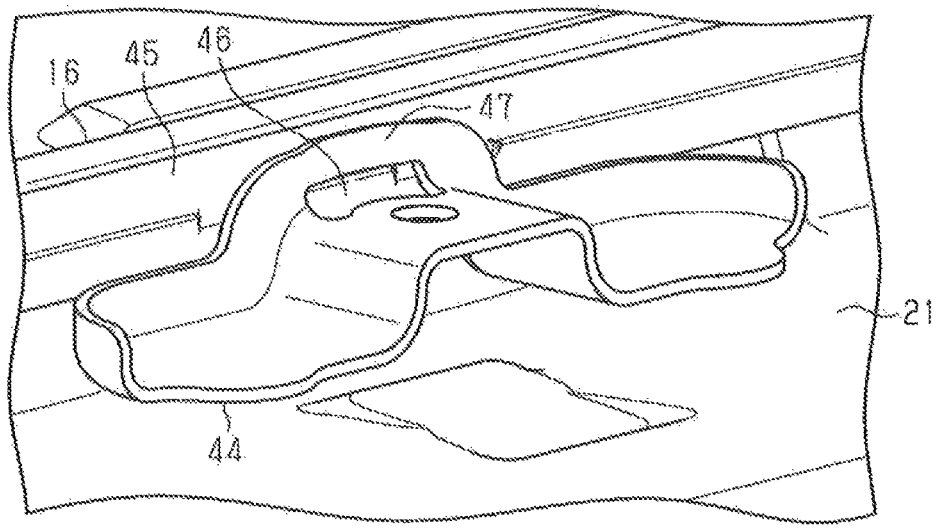
FIG. 9 is a perspective view illustrating a positioning structure of the positioning portion.

As illustrated in FIG. 9, a projection 46 for locking the positioning portion 44 is provided on a side surface of the lower deflector 16. The projection 46 of the example is formed, for example, in a stepped shape and a plurality of the projections 46 are provided so as to form a set with each of the positioning portions 44. Each of the positioning portions 44 faces the lower deflector 16 of which the both ends are attached to the drain members 22 and a locking piece 47 formed in the positioning portion 44 is locked to the projection 46 of the lower deflector 16. Therefore, the lower deflector 16 is positioned in an attached state.

Next, operations and effects of the deflector apparatus 9 will be described with reference to FIGS. 7 and 10.

As illustrated in FIG. 7, the pair of the second locking portions 32 (only one is illustrated in FIG. 7) provided in the lower deflector 16 in the vehicle width direction is locked to the first locking portions 30 (only one is illustrated in FIG. 7) formed in the drain member 22 to face the second locking portions 32 respectively. Therefore, the lower deflector 16 attached to the lower end of the mesh member 14 is attached and fixed to a vehicle side. In the case of the example, the projection 34 of the second locking portion 32 is inserted into the locking hole 31 of the first locking portion 30 from inside and thereby the first locking portion 30 and the second locking portion 32 are locked. Therefore, the lower deflector 16 can be firmly fixed to the drain member 22.

As described above, in a case of the deflector attaching structure of the example, the drain member 22 for discharging the fluid such as water is utilized as an attachment destination of the deflector. Therefore, in the attachment of the deflector 13, it is only necessary to provide the first locking portion 30 for attaching the deflector in the drain member 22 and the second locking portion 32 forming a set with the first locking portion 30 in the deflector 13. Therefore, in the deflector apparatus 9, it is possible to simplify the attaching structure of the deflector 13. In addition, since it is not necessary to newly prepare a component for fixing the lower deflector 16, it is also possible to reduce the number of components required for the deflector apparatus 9.

The plurality of sets of the first locking portion 30 and the second locking portion 32 are provided. Therefore, since the deflector 13 (lower deflector 16) can be firmly attached and fixed to the attachment destination (drain member 22) by the plurality of sets of the first locking portion 30 and the second locking portion 32, it is advantageous in securing the attaching strength of the deflector 13.

The sets of the first locking portion 30 and the second locking portion 32 are respectively disposed at the both ends of the deflector 13 (lower deflector 16) in the width direction. Therefore, since the deflector 13 (lower deflector 16) is fixed to the attachment destination (drain member 22) by the first locking portions 30 and the second locking portions 32 at the both ends, it is further advantageous in securing the attaching strength of the deflector 13.

Figure 10:
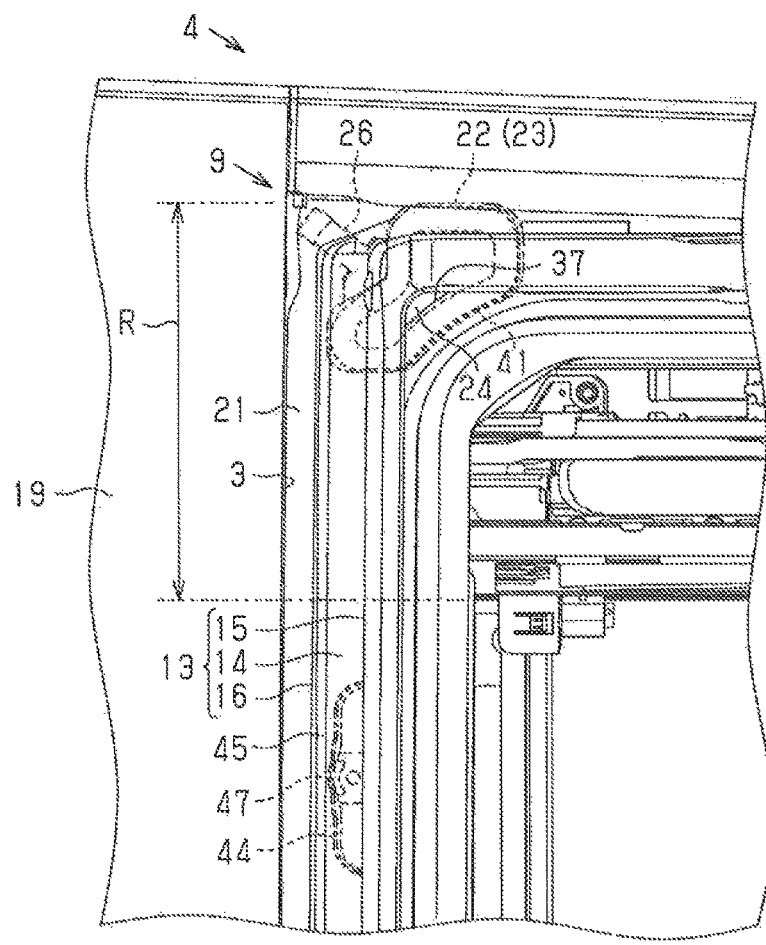
FIG. 10 is an explanatory view illustrating that an existence range of the deflector can be widened.

As illustrated in FIG. 10, if the deflector attaching structure of the example is used, an existence range of the deflector 13 can also be widened by a width "R" in the drawing. According to the configuration, when a deflector attaching portion is provided in the drain member 22, only the first locking portion 30 can be projected onto the upper surface of the base panel 21. Therefore, for example, the attaching structure of the drain member 22 or the like can utilizes a back surface of the base panel 21. Therefore, it is possible to cover the deflector 13 in the width direction (vehicle width direction) of the deflector 13 over a wide range with the mesh member 14. Therefore, it is advantageous in obtaining a wind noise suppressing effect.

In addition, since a load is applied to the drain member 22 in an upward direction (direction in which the deflector 13 is pulled) by the deflector 13, it is possible to improve sealing performance by the seal member 41 disposed between the drain member 22 and the base panel 21. Furthermore, the deflector 13 is pulled by the seal member 41 and flapping of the deflector 13 can also be suppressed.

The position between the both ends of the lower deflector 16 is fixed by the positioning portion 44 separately formed from the drain member 22. Therefore, when the lower deflector 16 is attached to the attachment destination (drain member 22) by the first locking portion 30 and the second locking portion 32, the attached state can be firmly held by the positioning portion 44. Therefore, it is further advantageous in securing the attaching strength of the deflector 13.

The driving source 6 for opening and closing the movable panel 5 is disposed in rear of the opening portion 3 in which the movable panel 5 is accommodated. However, for example, if the driving source 6 of the movable panel 5 is disposed in front of the opening portion 3, a large space is required for disposing the driving source 6, and there is a concern that the opening portion 3 of the movable panel 5 is lowered, or there is a concern that the opening portion 3 is moved rearward. However, since the driving source 6 of the movable panel 5 is disposed in rear of the opening portion 3, the above-described concern does not occur. Therefore, it is possible to dispose the opening portion 3 at sufficient height and at the front side.

In a case of the example, the front panel 19 is a fixed panel which is attached and fixed to the vehicle body. Therefore, since it is not necessary to provide a structure for moving the front panel 19, it contributes to simplification of the device configuration. In addition, since the front panel 19 is a resin panel, the cost of the component can be suppressed to be low. Furthermore, since the front panel 19 is fixed to the vehicle body (base panel 21 in the example) by the adhesive (urethane adhesive in the example), the attaching structure of the front panel 19 is simple. In addition, since the deflector apparatus 9 is of the mesh type, the component cost can be kept low and the accommodation space can be reduced.

Moreover, the embodiment is not limited to the described-above configuration and may be changed as the following aspects.

The deflector apparatus 9 is not limited to a structure in which the deflector apparatus 9 is switched to the open state by a biasing member or the like in association with the opening operation of the movable panel 5, and the upper deflector 15 may be switched to the open state by a dedicated driving source.

The drain members 22 are not limited to being disposed at the both ends in the vehicle width direction and may be disposed at any position.

The drain member 22 is not limited to a state in which the first locking portion 30 is projected from the upper surface of the base panel 21 by being disposed along the opening hole 37 of the base panel 21. For example, the first locking portion 30 detours from the end edge of the base panel 21, extends toward the second locking portion 32 side, and thereby the first locking portion 30 may reach the second locking portion 32.

The drain member 22 is not limited to a structure in which the first locking portion 30 is projected from the upper surface of the base panel 21 and the body portion 23 is positioned below the lower surface of the base panel 21. For example, the entire drain member 22 can be changed to another disposition aspect such as being attached to the upper surface of the base panel 21.

The number of the drain members 22 is not limited to two and can be appropriately changed.

The number of the sets of the first locking portion 30 and the second locking portion 32 may be one. The shapes and the positions of the first locking portion 30 and the second locking portion 32, or the like may be appropriately changed to other examples than the embodiment.

The positioning portion 44 may have any structure as long as it can fix the position of the lower deflector 16 of the attached state.

The front panel 19 is not limited to being attached to the base panel 21 and may be attached and fixed to the vehicle body.

The front panel 19 may be omitted.

The deflector apparatus 9 is not limited to being applied to the vehicle 1 and is applicable to another device or apparatus.

A deflector apparatus according to an aspect of this disclosure includes: a first locking portion for attaching a mesh type deflector, which reduces noise due to wind at an opening portion, to a drain member for suppressing infiltration of a fluid from the opening portion opened by a movable panel into a room; and a second locking portion formed in the deflector, in which the deflector is attached to the drain member by locking the second locking portion to the first locking portion.

According to the configuration, the drain member for draining the fluid is used as an attachment destination of the deflector. Therefore, in the attachment of the deflector, it is only necessary to provide the first locking portion for attaching the deflector in the drain member and the second locking portion forming a set with the first locking portion in the deflector. Therefore, in the deflector apparatus, it is possible to simplify an attaching structure of the deflector.

It is preferable that a plurality of sets of the first locking portion and the second locking portion are provided in the deflector apparatus. According to this configuration, since the deflector can be firmly attached and fixed to the attachment destination by the plurality of sets of the first locking portion and the second locking portion, it is advantageous in securing the attaching strength of the deflector.

In the deflector apparatus, it is preferable that each of the sets of the first locking portion and the second locking portion is disposed at both ends of the deflector in a width direction. According to this configuration, since the deflector can be fixed to the attachment destination with the first locking portion and the second locking portion at the both ends, the deflector is more advantageous in securing the attaching strength of the deflector.

In the deflector apparatus, it is preferable that in the drain member, a body portion of the drain member is disposed below a lower surface of a base panel in an apparatus and the first locking portion is disposed so as to protrude upward relative to an upper surface of the base panel. According to this configuration, when a deflector attaching portion is provided in the drain member, only the first locking portion that is the attaching portion can be projected onto the upper surface of the base panel. Therefore, for example, the attaching structure of the drain member or the like can utilizes a back surface of the base panel. Therefore, this makes it difficult for the drain member to influence a disposition space of the deflector and it is possible to extend the deflector to a sufficiently long range. Therefore, it is possible to cover the deflector in the width direction of the deflector over a wide range with the mesh member. Therefore, it is advantageous in obtaining a wind noise suppressing effect.

In the deflector apparatus, it is preferable that the deflector includes a mesh member, an upper deflector on a movable side for supporting the mesh member, and a lower deflector on a fixed side for supporting the mesh member, and a position between both ends of the lower deflector is fixed by a positioning portion formed separately from the drain member. According to this configuration, when the lower deflector is attached to the attachment destination by the first locking portion and the second locking portion, an attached state can be firmly held by the positioning portion. Therefore, it is more advantageous in securing the attaching strength of the deflector.

In the deflector apparatus, it is preferable that a driving source for opening and closing the movable panel is disposed in rear of the opening portion in which the movable panel is accommodated. According to this configuration, for example, if the driving source of the movable panel is disposed in front of the opening portion, a large space is required for disposing the driving source, and there is a concern that the opening portion of the movable panel is lowered, or there is a concern that the opening portion is moved rearward. However, since the driving source of the movable panel is disposed in rear of the opening portion, the above-described concern does not occur. Therefore, it is possible to dispose the opening portion at sufficient height and at the front side.

In the deflector apparatus, it is preferable that a front panel disposed in front of the movable panel is a fixed panel which is configured to be attached and fixed to a vehicle body. According to this configuration, since a structure for moving the front panel is not required, it contributes to simplification of an apparatus configuration.

According to the aspect of this disclosure, in the deflector apparatus, it is possible to simplify the attaching structure.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A deflector apparatus comprising:
   a first locking portion for attaching a mesh type deflector, which reduces noise due to wind at an opening portion, to a drain member for suppressing infiltration of a fluid from the opening portion opened by a movable panel into a room; and
   a second locking portion formed in the deflector,
   wherein the deflector is attached to the drain member by locking the second locking portion to the first locking portion, and
   wherein in the drain member, a body portion of the drain member is disposed below a lower surface of a base panel in an apparatus and the first locking portion is disposed so as to protrude upward relative to an upper surface of the base panel.

2. The deflector apparatus according to claim 1, wherein a plurality of sets of the first locking portion and the second locking portion are provided.

3. The deflector apparatus according to claim 2, wherein each of the sets of the first locking portion and the second locking portion is disposed at both ends of the deflector in a width direction.

4. The deflector apparatus according to claim 1, wherein the deflector includes a mesh member, an upper deflector on a movable side for supporting the mesh member, and a lower deflector on a fixed side for supporting the mesh member, and
   a position between both ends of the lower deflector is fixed by a positioning portion formed separately from the drain member.

5. The deflector apparatus according to claim 1, wherein a driving source for opening and closing the movable panel is disposed in rear of the opening portion in which the movable panel is accommodated.

6. The deflector apparatus according to claim 1, wherein a front panel disposed in front of the movable panel is a fixed panel configured to be attached and fixed to a vehicle body.

* * * * *